United States Patent [19]

Geary, Jr.

[11] 4,392,345
[45] Jul. 12, 1983

[54] BYPASS CONTROL SYSTEM

[75] Inventor: Carl H. Geary, Jr., Greensburg, Pa.

[73] Assignee: Elliott Turbomachinery Co., Inc., Jeannette, Pa.

[21] Appl. No.: 310,942

[22] Filed: Oct. 13, 1981

[51] Int. Cl.³ .................. F02G 3/00; B65D 75/00; B01J 37/12
[52] U.S. Cl. ................. 60/39.02; 60/39.091; 208/153; 208/DIG. 1; 252/417
[58] Field of Search ............ 60/39.25, 39.091, 39.092; 208/154, DIG. 1, 153, 161, 163, 164; 252/417; 364/500

[56] References Cited

U.S. PATENT DOCUMENTS

| | | | |
|---|---|---|---|
| 3,401,124 | 9/1968 | Goulden | 252/417 |
| 3,743,430 | 7/1973 | Riggs | 356/438 |
| 3,843,268 | 10/1974 | Kaye | 250/574 |
| 3,867,640 | 2/1975 | Paulsen | 250/573 |
| 3,873,206 | 3/1975 | Wilcock | 356/338 |
| 4,071,298 | 1/1978 | Falconer | 356/338 |
| 4,072,006 | 2/1978 | Inubushi et al. | 60/39.25 |
| 4,137,462 | 1/1979 | Wyler | 250/573 |
| 4,175,865 | 11/1979 | Horvath et al. | 356/338 |

FOREIGN PATENT DOCUMENTS

| | | |
|---|---|---|
| 1598138 | 10/1970 | Fed. Rep. of Germany . |
| 1598736 | 4/1971 | Fed. Rep. of Germany . |
| 2745483 | 4/1978 | Fed. Rep. of Germany . |
| 1141125 | 1/1969 | United Kingdom . |

OTHER PUBLICATIONS

Scheiman, A. D. "Key Factors must be Weighed in FCC Expander Bypass Selection." Oil and Gas Journal, Oct. 20, 1980, pp. 156 ff.

Primary Examiner—Louis J. Casaregola
Assistant Examiner—Timothy S. Thorpe
Attorney, Agent, or Firm—Donald F. Daley; David J. Zobkiw

[57] ABSTRACT

In a fluid catalytic cracking process in the case of a catalyst load dump the catalyst-laden gas is prevented from passing through the power recover expander. This is achieved by establishing a tangential, low pressure bypass flow path in the supply line to the expander which causes the catalyst to be bypassed. An optical sensor senses the catalyst load dump and causes the actuation of the valve necessary to establish the low pressure bypass flow path.

21 Claims, 7 Drawing Figures

BYPASS CONTROL SYSTEM

BACKGROUND OF THE INVENTION

In the fluid catalytic cracking (FCC) process for heavy petroleum fractions, the preheated high molecular weight hydrocarbon liquids and vapors are contacted with hot, solid catalyst particles and maintained at an elevated temperature in a fluidized or dispersed state for a period of time sufficient to effect the desired degree of cracking to lower molecular weight hydrocarbons. In the FCC process, some non-volatile carbonaceous material or "coke" is deposited on the catalyst particles which reduces the effectiveness of the catalyst. Regeneration of the catalyst is achieved by burning the coke deposits from the catalyst. The hot gases resulting from burning the coke are passed through at least one cyclone separation means to remove the entrained regenerated catalyst. The regenerated catalyst is returned to the process while the cleaned hot gases are, typically, passed through a power recovery system.

A major problem experienced by users of power recovery equipment is process upsets. These process upsets may be the result of feedstock-to-catalyst pressure differentials, afterburn quench pressure build up, depressurization of the regenerator and other malfunctions which generally occur during new FCC plant startups but can occur at other times as well.

The only process upset which seems to be detrimental to the power recovery expander is a catalyst load dump which is caused by a rapid pressure drop in the regenerator. Some of the mechanisms which can cause this to happen are: (1) rapid opening of the bypass valve; (2) failure of the bypass valve control signal; (3) failure of signal lines to the bypass or throttle valve; (4) rapid opening of the throttle valve; (5) lack of sequencing communication between the throttle and bypass valves; and (6) backflow of feedstock into the regenerator causing rapid combustion and subsequent water quench. When a dump occurs, the whole fluidized bed is generally lost because once the cyclone dip tubes are exposed, all the catalyst goes. The amount of catalyst dumped is a function of the regenerator size and may vary from 20 to over 100 tons during a 15 to 30 minute time period. Not all of the catalyst goes through the expander, the majority of it goes through the bypass line into the waste heat boiler. When this happens, the catalyst goes out the stack of the waste heat boiler producing a large dust cloud which settles out over the area, much like volcanic ash. Settling out may take several days under proper atmospheric conditions. Since the catalyst is siliceous, such as silica-alumina, the catalyst passing through the expander results in severe erosion of a single stage expander and blockage of the second stage of a two-stage expander with the resultant wear down of the first stage rotor blades. Although the FCC process is under computer control, catalyst load dumps are not identified until after they have taken place and the expander is damaged.

SUMMARY OF THE INVENTION

During a process upset catalyst load dump, large concentrations of dumped catalyst are bypassed to prevent their passing through the expander. Preferably, the dumped catalyst is bypassed to a place where it can be recovered. However, in retrofit installations it may be necessary to just protect the expander and bypass the catalyst to the waste heat boiler. In the preferred embodiment, a tangential catalyst bypass path is provided at the mid portion of a 90° bend in the expander feed line and forms a part of the catalyst bypass line. When a valve in the catalyst bypass line is opened in response to a catalyst load dump, the catalyst is caused to be bypassed to the catalyst bypass line. Preferably, the catalyst bypass line contains catalyst recovery structure.

It is an object of this invention to provide a method and apparatus for preventing dumped catalyst from passing through the expander of a power recovery system.

It is an additional object of this invention to provide a method and apparatus for recovering the catalsyt dumped during a process upset load dump.

It is another object of this invention to provide a method and apparatus for protecting the power recovery expander used in an FCC process.

It is a further object of this invention to provide a condition responsive bypass system. These objects, and others as will become apparent hereinafter, are accomplished by the present invention.

Basically, a laser source directs a beam across the pipe carrying the combustion products from the regenerator and this beam is detected by a photo sensor. The intensity of the incident light sensed is a measure of the particulate density flowing through the pipe and a signal indicative thereof is supplied to the microprocessor controlling the FCC process. A signal indicative of a catalyst load dump acts as an override signal and causes the opening of a discharge valve on the lock hopper. The opening of the lock hopper discharge valve creates a pressure drop in the lock hopper and the catalyst bypass line. Since the catalyst bypass line is tangential with the mid point of a 90° bend, the catalyst passes into the catalyst bypass line and lock hopper where it is collected. When process conditions are reestablished, the laser sensor signal furnished to the microprocessor causes the lock hopper discharge valve to close thereby causing the gas stream to pass through the expander.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
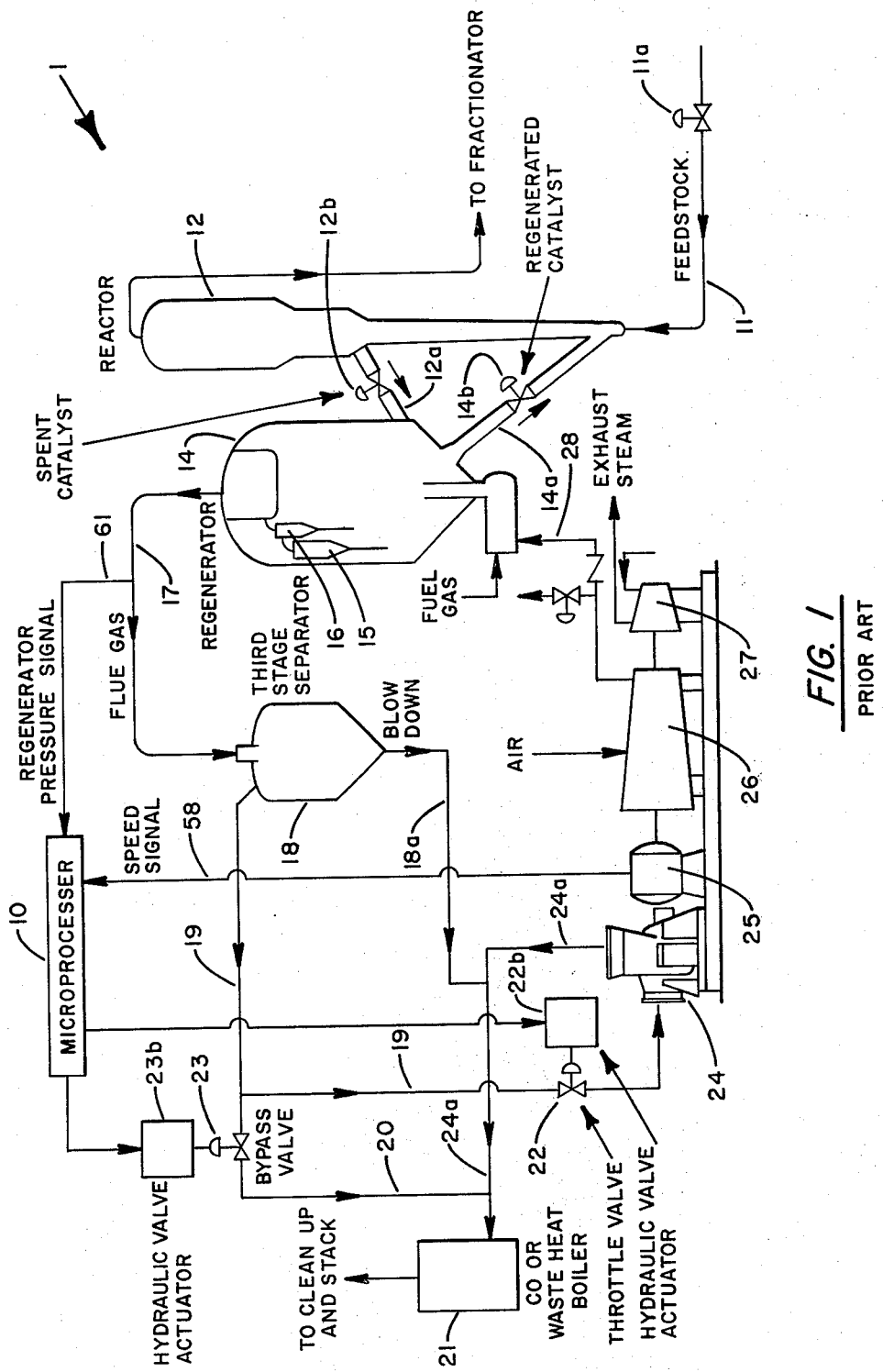
FIG. 1 is a schematic representation of a PRIOR ART FCC unit with power recovery.

In FIG. 1, the numeral 1 generally designates a PRIOR ART FCC unit with power recovery which is controlled by microprocessor or computer 10. The "coked" or spent catalyst is continuously supplied to the regenerator 14 by the reactor 12 via line 12a which contains valve 12b. In the regenerator 14, the coke is burned off of the catalyst and the resultant combustion products together with entrained catalyst are directed to first and second stage regenerator cyclones 15 and 16, respectively, which generally remove the larger particles of catalyst from the gas stream. The regenerated catalyst is returned to the reactor 12 by the regenerator 14 via line 14a which contains valve 14b and which combines with feedstock supply line 11 to feed reactor 12. Feedstock supply line 11 contains valve 11a which is controlled in conjunction with valve 14b to balance the pressures of the lines 14a and 11 so that they can be combined and fed into the reactor 12. The flue gas passes from regenerator 14 via line 17 to a third stage separator 18 where smaller catalyst particles are removed and are sent as blow down to waste heat boiler 21 via lines 18a and 24a. The remaining entrained catalyst particles remain with the gas stream and pass through the line 19 to power recovery expander 24 or are bypassed via bypass line 20. The power recovery expander 24 is in a string that serially includes motor/generator 25, air compressor 26 and steam turbine 27. Typically, the expander 24 is used to drive compressor 26 to supply combustion air for the regenerator 12 via line 28. After passing through expander 24, the gas passes through line 24a and recombines with the bypassed gas from line 20 and the blow down from line 18a and is directed to heat recovery, typically a CO or waste heat boiler 21. Bypass line 20 together with valves 22 and 23, which are respectively located in lines 19 and 20 and responsive to regenerator pressure under the control of microprocessor 10, provide the necessary control for bringing the power recovery string on line, for maintaining the regenerator pressure and for unloading the power recovery train. Under normal operation, the throttle valve 22 is fully open and passing approximately 90% of the total flow from the third stage separator 18 through the expander 24. The remaining 10% is passed to the waste heat boiler 21 by bypass valve 23 which is open perhaps 15° for linear control purposes since both valves 22 and 23 are butterfly valves. Valves 22 and 23 are controlled by microprocessor 10 through hydraulic valve actuators 22b and 23b, respectively, and are under split range control so that when valve 22 begins to close, valve 23 begins to open thereby maintaining the pressure at the regenerator within ±2 psi. The microprocessor 10 controls valves 22 and 23 in response to the pressure of regenerator 14 or the flue gas upstream of third stage separator 18 which is furnished via line 61. An overspeed of motor/generator 25 caused by an electrical load dump results in a speed signal which is furnished to microprocessor 10. Microprocessor 10 causes valve 22 to be closed and valve 23 opened, in response to an overspeed signal.

During a major process upset, the cyclones 15 and 16 and the third stage separator 18 become totally ineffective since they are designed to handle specific amounts of catalyst-laden gas. As a result, blockages occur and large concentrations of large size particles pass through the third stage separator 18 into the expander 24 creating havoc. While most of the catalyst laden gas passes through bypass line 20 and on to the waste heat boiler and the atmosphere, the amount of catalyst reaching the expander 24 is sufficient to clog the expander and erode the blades. Since a catalyst dump is not sensed as such by the PRIOR ART system, it is treated as other process upsets by attempting pressure and temperature control etc. and is not identified until after the fact when, typically, the expander is damaged.

Figure 2:
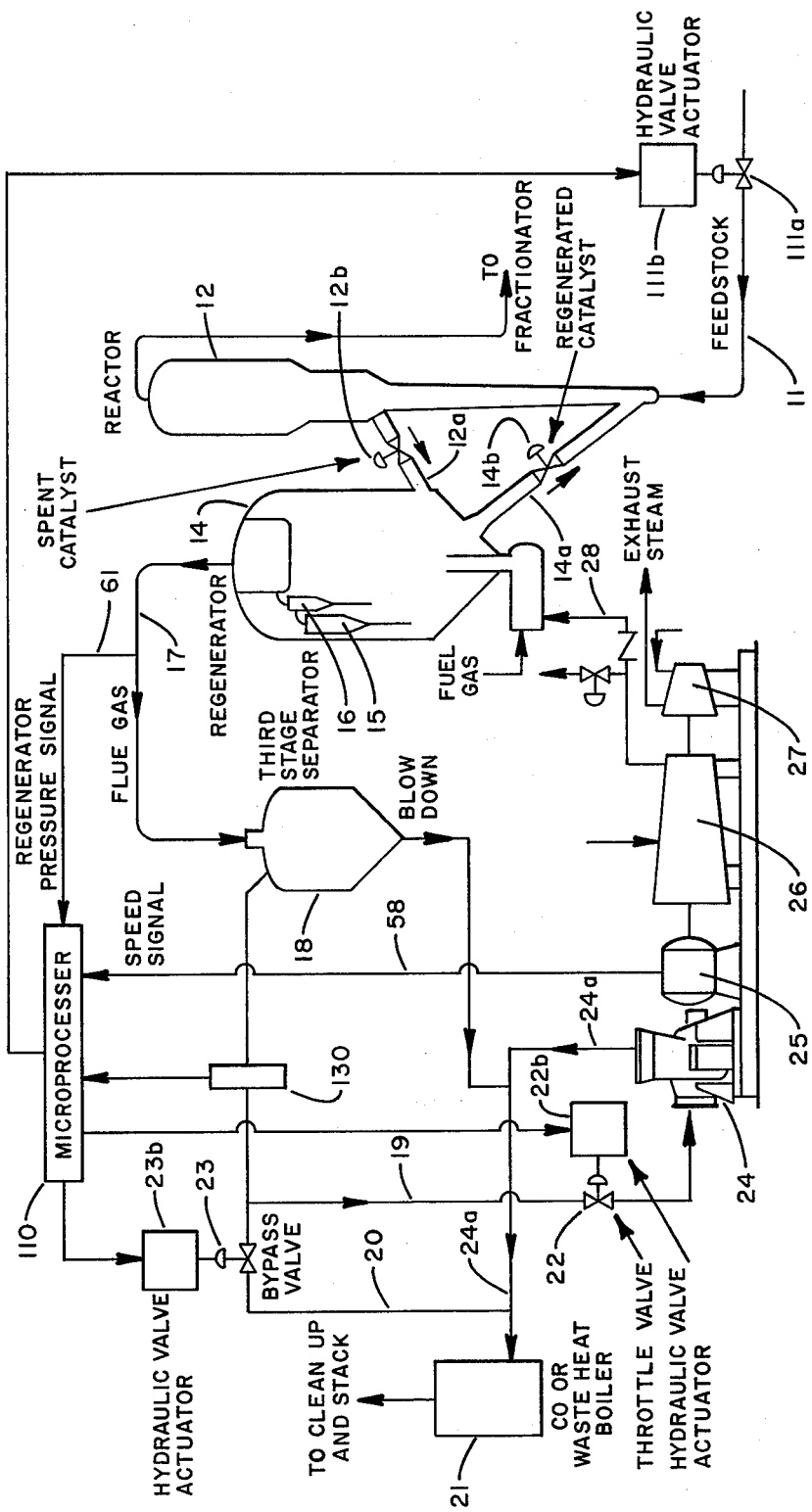
FIG. 2 is a schematic representation of an FCC process retrofit to incorporate the present invention.
Figures 3, 4:
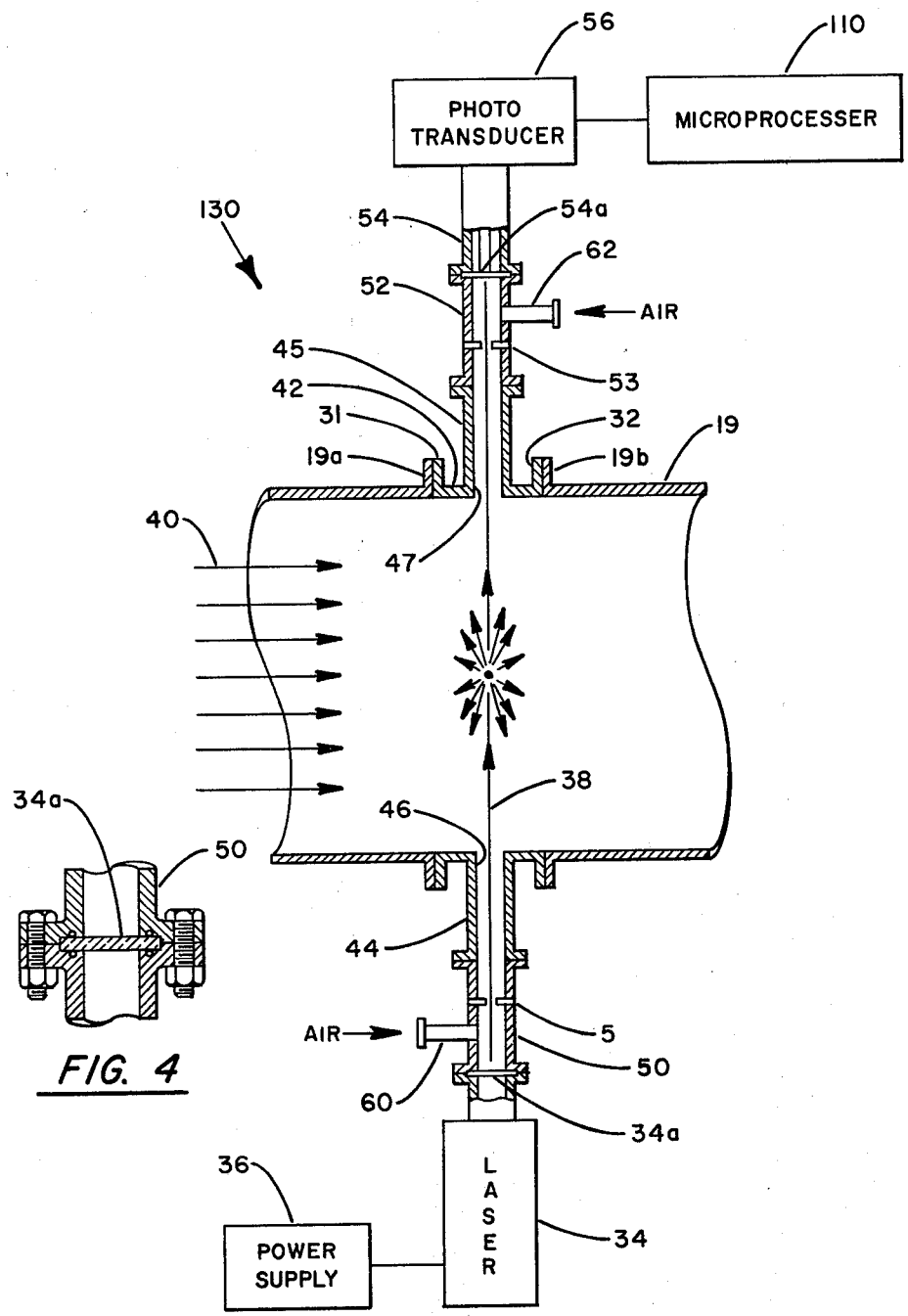
FIG. 3 is a schematic partially sectioned view of the optical sensor of the present invention.
FIG. 4 is an enlarged view of the seal structure for the laser window.

The regenerator system 1 of the FIG. 1 system can be modified as shown in FIG. 2 to retrofit the present invention into an existing FCC unit. In FIG. 2 all modified structure is numbered 100 higher than the corresponding structure of FIG. 1 and all new structure is also in the 100 series. An optical sensor generally indicated by the numeral 130 is placed in line 19 which leads from third stage separator 18 to expander 24. If possible, lines 19 and 20 should join at a tee connection such that line 19 enters horizontally and exits vertically downward so that the bypass flow has a straight flow path for reasons discussed below. As best shown in FIG. 3, optical sensor 130 has flanges 31 and 32 for the removable attachment of sensor 130 to corresponding flanges 19a and 19b of line 19. As noted above, the gas stream delivered to power recovery expander 24 as the motivating fluid has particulate matter entrained therein. Laser light source 34 is positioned upstream of expander 24 and is powered by power supply 36. Laser 34 transmits a coherent beam of light represented by arrows 38 normal to the flow path of the gas stream indicated by arrows 40. Sensor housing section 42 includes first and second elongated cylindrical members 44 and 45 which are diametrically located. Members 44 and 45 define respective orifices or apertures 46 and 47 in the interior surface of housing section 42.

Laser 34 transmits a beam of light 38 that serially passes through laser window 34a, purge structure 50 which includes pressure maintaining orifice 51, member 44, aperture 46, across gas stream 40, through aperture 47, member 45, purge structure 52 which includes pressure maintaining orifice 53 and lens 54a before reaching sensor element 54. Both laser window 34a and lens 54a are preferably quartz glass for heat resistance and are sealed to prevent air leakage. FIG. 4 illustrates the sealing details of window 34a and lens 54a would be similarly sealed. Window 34a is of an infinite focal length whereas lens 54a focuses the beam 38 on sensor element 54. The sensor element 54 is preferably a fiber optic device that transmits the beam of light received from laser 34 to photo transducer 56 which in turn sends an electrical signal to microprocessor 110. Valve 60 controls the passage of a pressurized fluid, such as air, into purge structure 50 for pressurizing the chamber defined by member 44 to prevent particulate matter from entering into the chamber via aperture 46. Orifice 51 acting in combination with the valve 60 maintains the desired positive pressure within the chamber defined by member 44. It will be noted that the purge air prevents the particulates from entering and settling out in the chamber defined by member 44 and from reaching window 34a even where laser window 34a is located below line 19, as illustrated. Thus the purge air is used to prevent the window 34a from getting dirty rather than cleaning it after it gets dirty.

Similarly, orifice 53 acts in combination with valve 62 to maintain the desired pressure within the chamber defined by member 45 to prevent particulate matter from entering into the chamber via aperture 47. Additionally, orifices 53 and 51, by defining part of the light path of beam 38, greatly reduce the effects of light scatter on sensor 54 by limiting the cross section of the beam 38 and blocking extraneous light. This is especially important if a light source other than a laser is used.

In operation, laser 34 generates a beam of light 38 which is transmitted normal to the flow path of the gas stream 40. As the beam of light 38 strikes the particulate matter entrained in the gas stream the light is dispersed according to the density or concentration of the particulate matter within the gas stream. That is to say, if the gas stream is relatively free of particulate matter then there will be only minimal scattering of the beam of light and a relatively strong beam of light will pass through aperture 53 to sensor 54. On the other hand, if the concentration of particulate matter is relatively high, then the beam of light transmitted through aperture 53 to sensor 54 will be relatively weak, or even totally blocked. A dense concentration of the particulate matter causes most, or all, of the light to be dispersed or prevented from passing along the light path defined by beam 38 such that aperture 53 and sensor 54 are aligned as is necessary for the light to be sensed.

The fiber optic sensor 54 transmits the incident light to photo transducer 56 with the magnitude varying directly with the intensity of the beam reaching sensor 54. Thus, when a relatively weak beam of light is transmitted to photo transducer 56, the signal generated thereby will be relatively weak. Similarly, when the beam of light transmitted to photo transducer 56 is relatively strong, then the signal generated thereby will be likewise of a relatively large magnitude. As noted previously, the intensity of the light beam varies with the concentration or density of the particulate matter entrained within the gas stream. The signal generated by photo transducer 56 is transmitted to microprocessor 110 for controlling valves 22, 23 and 111a upon the detection of a process upset load dump. If the particulate matter concentration within the gas stream exceeds an adjustable preset level indicative of a catalyst load dump, valves 22 and 111a are closed and valve 23 is fully opened by microprocessor 110 in response to the signal from photo transducer 56 if the regenerator pressure signal supplied by line 61 also indicates a catalyst load dump. Because a catalyst load dump is associated with a pressure drop in the system, the pressure, or preferably the rate of change in pressure in the regenerator as determined by a derivative pressure sensor or controller must be indicative of a catalyst load dump before the FCC system is shut down. So that responsive to a sensing of catalyst, or particulates only, and not a pressure drop, valve 22 will be rapidly closed to protect the expander and an alarm will be sounded for the operator(s) of the system to take corrective action, but the system will not be shut down. This is a fail safe response to protect the expander and would be the response to a laser failure, for example. Upon the detection of a particulate matter concentration indicative of a process upset load dump and a regenerator pressure increase, the throttle valve 22 is caused to close quickly and bypass valve 23 is caused to open quickly. This is different than the normal operation of valves 22 and 23 as would be the case in the FIG. 1 system. The quick response should take place because the process upset is already in process and because the optical sensor 130 has sensed a load dump and a pressure drop has been indicated. Most likely, all of the catalyst will be dumped. Additionally, the microprocessor 110 will send a signal to hydraulic valve actuator 111b to cause valve 111a in feed stock line 11 to be closed so as to prevent feedstock from entering the regenerator and burning. If for some reason the catalyst dump clears, valves 22, 23 and 111a, would immediately be reset and normal operation could proceed. When valve 22 is closed, all of the flow will pass through line 20. If lines 19 and 20 join in a tee, as noted above, the catalyst entrained gas will have a straight flow which will help carry the catalyst to the waste heat boiler.

Figure 5:
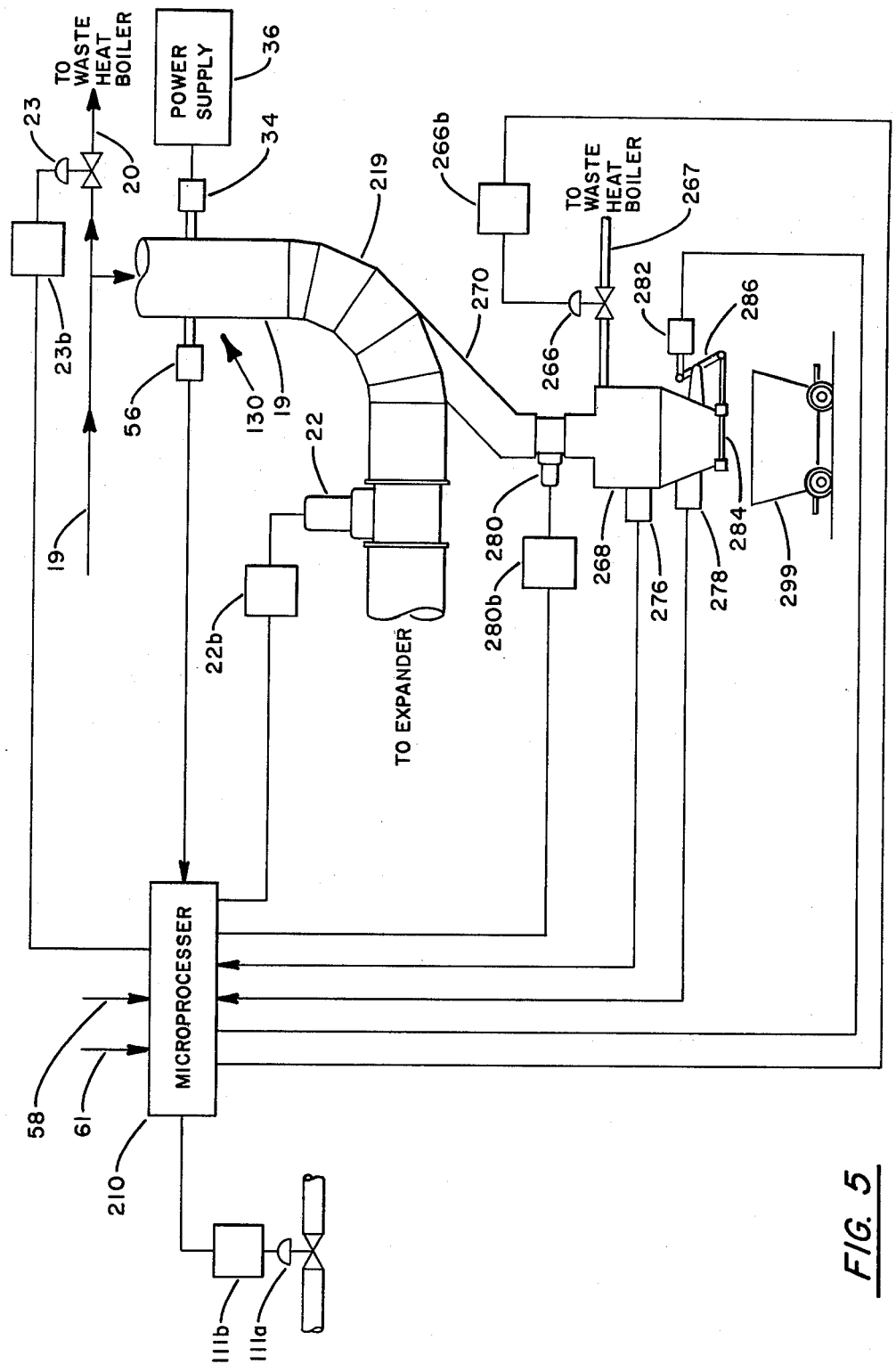
FIG. 5 is a schematic representation of an initial installation employing the present invention.
Figure 6:
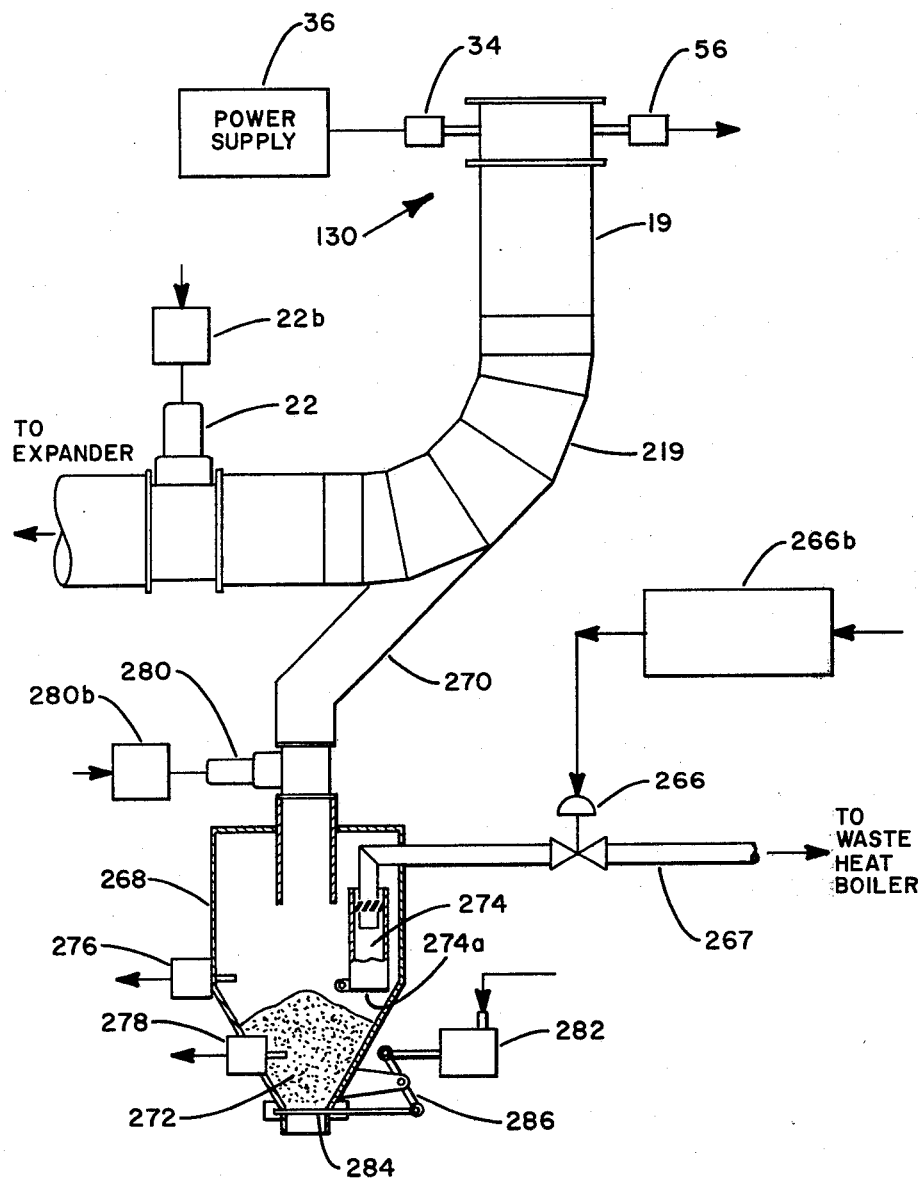
FIG. 6 is a more detailed representation of the catalyst bypass structure of the FIG. 5 device.

The result of the detection of the load dump is that all of the gas is bypassed and goes to the waste heat boiler 21 rather than having some of the catalyst-laden gas go through the expander which would be destroyed thereby. In this arrangement the expander is protected but the catalyst bypassed to the waste heat boiler is lost, just as it would be if the present invention was not retrofit into the system. During normal operating conditions, microprocessor 110 controls valves 22 and 23 in response a regenerator pressure signal received via line 61, as is conventional. Microprocessor 110 functions the same as the microprocessor 10 of the FIG. 1 system except during a load dump. Thus the structural differences of the FIG. 2 system over the FIG. 1 system is the modification of microprocessor 110 and feed stock valve 111a and the addition of sensor 130. Functionally, the control of valves 22, 23 and 111a is different only during a catalyst load dump or at least the sensing of one by the sensor 130.

Where the present invention is to be incorporated into the initial construction of an FCC system, a typical construction would be that illustrated in FIGS. 5 and 6. In FIGS. 5 and 6, all modified structure is numbered in the 200 series as is all new structure while all unmodified structure is numbered as in FIGS. 1-3 and is structurally the same. Laser 34 is located outside of pipe or line 19 which runs from the third stage separator and is preferably located in a vertical run of line 19 to help keep members 44 and 45 free of particulates as well as for other reasons that will be discussed hereinafter. The beam from the laser 34 traverses the diameter of pipe 19 and impinges upon photo transducer 56 which is also mounted on pipe 19 diametrically opposite laser 34. Because the laser beam is coherent, both the laser 34 and sensor element 54, which is optically connected to photo transducer 56, can be air purged without introducing large amounts of air into the gas stream and thereby creating the possibility of gas afterburn. The photo transducer 56 transmits a signal to microprocessor 210 which operates lock hopper discharge valve 266 through hydraulic valve actuator 266b and valve 22 through hydraulic valve actuator 22b in response to a signal from the photo transducer 56 indicating a catalyst load dump. The sensitivity of the photo transducer 56 can be adjusted to sense various types of disruptions to the laser beam. During normal operation the transducer 56 is unaffected by the amount of catalyst in line 19. However, when large amounts of catalyst pass through the beam, such as are experienced during a catalyst load dump, hydraulic valve actuator 226b causes the lock hopper discharge valve 266 to open and valve actuator 22b causes valve 22 to close in response to signals from microprocessor 210 and an alarm signal will be given to notify the operator(s). The opening of discharge valve 266 creates a pressure drop in lock hopper 268 by providing fluid communication to the waste heat boiler or atmosphere. As a result of the pressure drop, the large amount of catalyst moving down the vertical run of line 19 ahead of expander throttle valve 22 cannot conveniently negotiate a 90° turn 219 in pipe 19 as a result of the pressure drop and the centrifugal force experienced in the turn. So rather than passing on towards valve 22 and expander 24, the catalyst is passed into bypass pipe 270 which forms a tangential flow path from approximately the mid point of the 90° turn 219 in pipe 19. The catalyst passes via bypass pipe 270 to lock hopper 268 where it is collected. When process conditions are reestablished, the signal from transducer 56 to microprocessor 210 causes lock hopper discharge valve 266 to close the gas and valve 22 to open causing the gas stream to pass through the expander 24 once again. Only valve 266 will be opened and valve 22 closed unless a pressure signal furnished to microprocessor 210 via line 61 indicates the proper pressure conditions for a catalyst load dump. Preferably, the pressure signal is indicative of rate of change of pressure. If the pressure signal is also indicative of a catalyst load dump, microprocesser 210 will also cause valves 23 and 111a to close. When valve 22 is closed, motor/generator 25 will go into the motoring mode to maintain the string speed, as is conventional. During normal conditions, valves 22 and 23 are controlled in response to regenerator pressure conditions, as is conventional. Alternatively, during a catalyst load dump, valve 23 can be opened so that the expander will still be protected but only that portion of the catalyst passing through line 19 will be recovered, while the rest goes to the waste heat boiler 21. In this alternative operation, lines 19 and 20 preferably join in a tee connection as discussed above.

As best shown in FIG. 6, the bypassed gas and catalyst passes into lock hopper 268 where the catalyst 272 settles out while the gas must pass through vortex tube or cyclone 274 before leaving lock hopper 268 to go to the waste heat boiler or atmospheric dump. Foot valve 274a provides a one way flow of gas through cyclone 274 to line 267. In this way catalyst is prevented from being discharged into the atmosphere directly or via the waste heat boiler. When the catalyst 272 builds up to a certain level in the lock hopper 268, high level sensor 276 is actuated and supplies a signal to microprocessor 210 which in turn signals hydraulic valve actuator 280b to cause lock valve 280 to close, actuates the valve motor 282 of slide valve 284 to open valve 284 and, if a catalyst load dump is in progress, causes valve 23 to open. When valve motor 282, which can be any suitable conventional piston, for example, acts through the linkage 286 of slide valve 284 to open the slide valve, the trapped catalyst 272 is dumped into dump cart 299. The dump cart 299 is then used to return the catalyst into the regenerator where it is reintroduced into the fluidized bed. When the level of catalyst 272 has been sufficiently lowered in the lock hopper 268, low level sensor 278 is actuated and supplies a signal to microprocessor 210 which, in turn, causes valve 280 to open and causes valve motor 282 to close valve 284. Additionally, if a catalyst load dump is in progress, valve 23 will be closed. Valve 23 may be opened in response to a pressure buildup if the catalyst bypass leg 270 is unable to handle the full flow and will attempt to maintain regenerator pressure. It will be noted that in dumping the catalyst 272 from the lock hopper 268 the catalyst bypass function does not cease and catalyst still flowing in the line 19 will be carried by centrifugal force and vector velocity into the pipe 270 upstream of valve 280 since pipe 270 may be up to 20 feet long and over 4 feet in diameter. However, the lock hopper 268 is, preferably, large enough to accommodate all of the catalyst carried over without requiring dumping during a catalyst load dump.

In the normal operation of the FCC process, the embodiment of FIGS. 5 and 6 serves an additional function. With lock hopper discharge valve 266 closed and lock valve 280 open, a vortex is established in bypass leg 270. Catalyst attempting to make the 90° bend 219 in pipe 19 becomes trapped in this vortex and descends very slowly into the lock hopper 268. In effect, a fourth stage separator is created by the bypass configuration of FIGS. 5 and 6. This means that less catalyst will pass through the blades of the expander during normal operation and this means a longer life for the blades. The catalyst accumulation as a result of the fourth stage separator, if in a sufficient amount, would actuate level sensor 276, as described above, so as to cause the trapped catalyst to be dumped.

Figure 7:
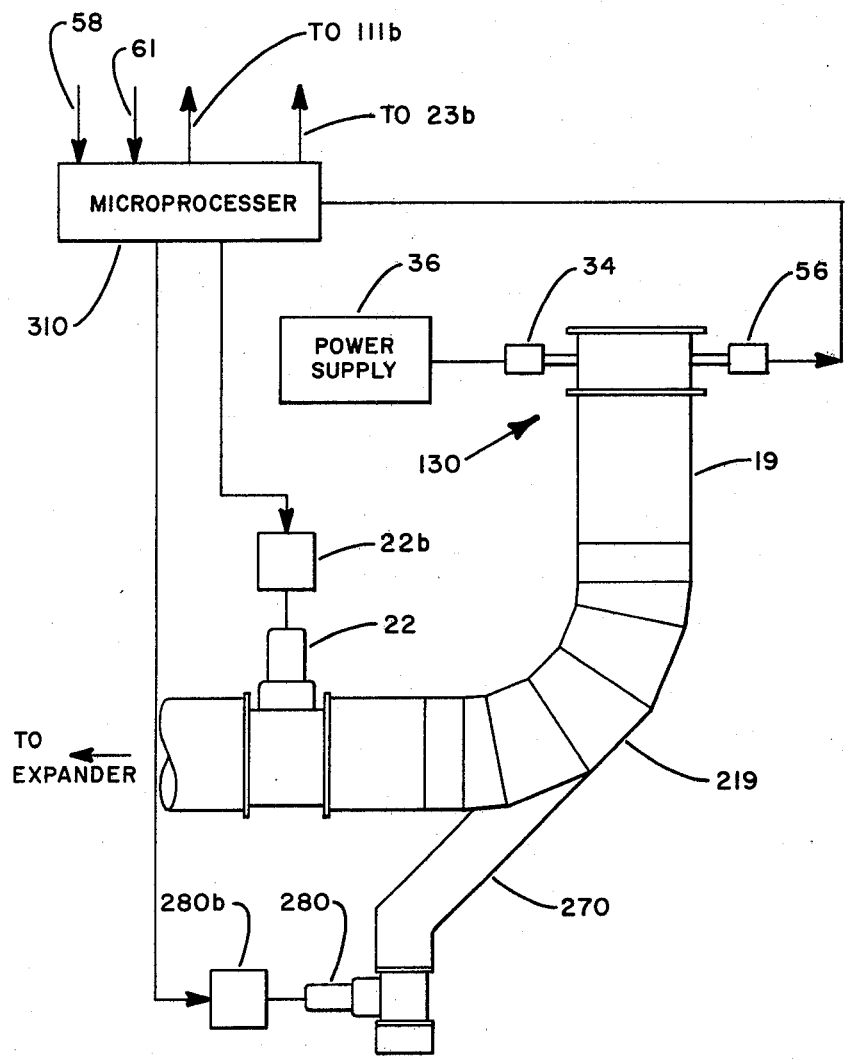
FIG. 7 is a schematic representation of a simplified embodiment.

If the fourth stage separator function and catalyst recovery are not desired or economically justified, the embodiment of FIGS. 5 and 6 can be simplified by eliminating all of the structure downstream of the lock valve. Referring now to FIG. 7, the hydraulic valve actuator 280b causes the opening of lock valve 280 in response to a signal from microprocessor 310. When the sensor 130 detects too much catalyst in the line 19, valve 22 will be closed and the valve 280 will be opened to prevent the catalyst from reaching the expander and an alarm signal will be given. If a pressure signal supplied via line 61 confirms a catalyst load dump, valves 23 and 111a will be closed. Valve 280 will be closed and valve 22 will be opened when sensor 130 detects a permissible catalyst level again. If valves 23 and 111a were closed, they will be opened. Although this embodiment will lose the catalyst it will not pass through the stack as where directed to a waste heat boiler. The risk of such a localized clean up may be justified given the protection of the expander and the infrequency of a catalyst load dump. This embodiment can also be retrofit into the FCC system of FIG. 1 at the bottom of the third stage separator or in a vertical leg of line 19 and/or 20.

In summary, the present invention protects the power recovery expander of an FCC system by preventing a catalyst load dump from passing through the expander. The detection of a catalyst or particulate flow of a predetermined magnitude triggers the expander protection. However, if the catalyst load dump is confirmed by the sensing of a pressure change in the regenerator, as through a derivative pressure sensor, further steps are taken to shut down the system. The expander protection can take the form of shutting off the flow to the expander or diverting the catalyst portion of the flow by a combination of centrifugal force and vector velocity. The catalyst can be recovered totally, or in part. The system is fail safe in that a false detection as through sensor failure triggers the expander protection without shutting down the entire system.

A suitable microprocessor which can be used for the various embodiments of the present invention is the model 43027 electronic governor manufactured by Woodward Governor Company of Fort Collins, Colo. The logic of the device would be set for the various modes of operation. Suitble hydraulic actuators for operating the valves are manufactured by M.E.A. Company of Des Plaines, Ill. Because of the size of the lines, the valves regulating flow in the various gas lines are generally butterfly valves.

Although preferred embodiments of the present invention have been illustrated and described, other changes will occur to those skilled in the art. For example, other optical sensors such as photocells or types using laser back-scatter may be employed. Similarly, the slide valve and its valve motor may be replaced with other suitable dispensing means. Also, the 90° bend may be replaced with a vertical tee but there would be no centrifugal forces without a bend in the catalyst flow path and the "square" turn produces flow losses in normal operation. It is therefore intended that the scope of the present invention is to be limited only by the scope of the appended claims.

What is claimed is:

1. A bypass control system for protecting a power recovery expander comprising:
   a power recovery expander;
   a first fluid path for supplying combustion gas which is subject to containing large amounts of particulates to said expander as a motive fluid;
   first valve means for controlling the flow of gas in said first fluid path;
   a second fluid path connected to said first fluid path for bypassing said expander;
   second valve means for controlling the flow of gas in said second fluid path;
   means for determining the particulate concentration in said combustion gas in said first fluid path and for generating a signal indicative thereof; and
   means for fully opening said second valve means in response to said signal when said signal represents a predetermined particulate level so as to prevent said particulates from passing through said expander.

2. The bypass control system of claim 1 wherein said second fluid path is connected to a waste heat boiler and said first valve means is closed when said predetermined particulate level in said gas is sensed.

3. The bypass control system of claim 1 wherein said first fluid path includes a vertically extending portion terminating in a 90° bend and said second fluid path extends tangentially from approximately the mid point of said 90° bend.

4. The bypass control system of claim 3 wherein said second fluid path serially includes said tangentially extending portion, a lock hopper and a lock hopper discharge line with said second valve means being located in said lock hopper discharge line.

5. The bypass control system of claim 4 further including means for unloading said lock hopper in response to a predetermined accumulation of particulates therein.

6. The bypass control system of claim 1 wherein said first fluid path includes a vertically extending portion and a horizontally extending portion and said second fluid path is a generally vertical extension of said vertically extending portion of said first fluid path.

7. The bypass control system of claim 6 wherein said second valve means is normally closed.

8. The bypass control system of claim 1 wherein said means for determining the particulate concentration is an optical sensor including means for keeping said sensor free of said particulates.

9. A bypass control system for protecting a power recovery expander comprising:
   a power recovery expander;
   a first fluid path means serially including a vertically downward extending portion and a 90° bend for supplying combustion gas which is subject to containing large amounts of particulates to said expander as a motive fluid;
   a second fluid path means extending tangentially from approximately the mid point of said 90° bend and being in fluid communication with said first fluid path;
   said second fluid path means further serially including a lock hopper means for collecting particulates and a lock hopper discharge line with a normally closed valve means therein;
   means for determining the particulate concentration in said gas in said first fluid path means and for generating a signal indicative thereof;
   means for opening said normally closed valve means in response to said signal when said signal represents a predetermined particulate level in said gas in said first fluid path means whereby when said normally closed valve means is closed, said tangentially extending second fluid path means creates a vortex which acts as a separator to remove particulate matter which passes into said lock hopper means and when said normally closed valve means is opened a pressure drop is created in said lock hopper means so that due to the pressure drop, vector velocity and centrifugal force particulates are directed into the second fluid path means to prevent them from passing through said expander.

10. The bypass control system of claim 9 wherein said lock hopper means includes means for sensing the particulate level therein and for unloading said lock hopper means in response to a predetermined particulate accumulation therein.

11. In a fluid catalytic cracking apparatus including a reactor, means for feeding feedstock to said reactor, a regenerator, and a power recovery expander, a bypass control system for protecting said power recovery expander comprising:
   a first fluid path for supplying combustion gas which is subject to containing large amounts of particulates from said regenerator to said expander as a motive fluid;
   a second fluid path connected to said first fluid path for bypassing said expander;
   first valve means for controlling the flow of said gas in said first fluid path;
   second valve means for controlling the flow of said gas in said second fluid path;
   means for determining the particulate concentration in said gas in said first fluid path and for generating a signal indicative thereof;
   means for determining a pressure condition of said regenerator and for generating a signal indicative thereof;
   means responsive to said signals for fully opening said second valve means in response to a signal representing a predetermined particulate level so as to prevent said particulates from passing through said expander and, if a signal representing a predetermined pressure condition is also received, for closing said means for feeding feedstock to said reactor.

12. The bypass control system of claim 11 further including:
   a third fluid path connected to said first fluid path for bypassing said expander;
   third valve means for controlling the flow of said gas in said third fluid path;
   said first valve means being normally fully open and said second valve means being normally fully closed.

13. The bypass control system of claim 11 wherein said first fluid path includes a vertically extending portion terminating in a 90° bend and said second fluid path extends tangentially from approximately the mid point of said 90° bend.

14. The bypass control system of claim 13 wherein said second fluid path serially includes said tangentially extending portion, a lock hopper and a lock hopper discharge line with said second valve means being located in said lock hopper discharge line.

15. The bypass control system of claim 14 further including means for unloading said lock hopper in response to a predetermined accumulation of particulates therein.

16. A method for bypass control to protect a power recovery expander comprising the steps of:
supplying combustion gas which is subject to containing large amounts of particulates to a power recovery expander as the motive fluid;
sensing the particulate concentration in the gas supplied to the expander;
when the sensed particulate concentration reaches a predetermined level, regulating the flow in a bypass line to prevent the particulates from passing through the expander.

17. The method of claim 16 wherein said step of regulating includes bypassing all of the combustion gas.

18. The method of claim 16 wherein said step of supplying combustion gas includes passing said gas vertically downward and then through a 90° bend before reaching the expander and the bypass line extends tangentially from approximately the mid point of the 90° bend so that particulates enter the bypass line due to centrifugal force.

19. A method for bypass control to protect a power recovery expander comprising the steps of:
supplying combustion gas which is subject to containing large amounts of particulates to a power recovery expander via a flow path that includes a vertically downward portion and a 90° bend;
sensing the particulate concentration in the gas supplied to the expander;
when the sensed particulate concentration reaches a predetermined level, opening a valve in a bypass line that initially extends tangentially from approximately the mid point of the 90° bend whereby a pressure drop is created in the bypass line and the particulates pass into the bypass line due to the pressure drop and centrifugal force; and
when the sensed particulate concentration is below a predetermined level keeping the valve in the bypass line closed whereby a vortex is created at the entrance to the bypass line which causes the separation of entrained particulates which slowly descend into the bypass line.

20. A method for bypass control to protect a power recovery expander in a fluid catalytic cracking process including a reactor, means for feeding feedstock to the reactor, and a regenerator comprising the steps of:
supplying combustion gas which is subject to containing large amounts of particulates from the regenerator to a power recovery expander;
sensing the particulate concentration in the gas supplied to the expander;
sensing a pressure condition in the regenerator;
when the sensed particulate concentration reaches a predetermined level, regulating the flow in a bypass line to prevent the particulates from passing through the expander and, if the sensed pressure condition is also of a predetermined value, closing the means for feeding feedstock to the reactor to thereby shut down the fluid catalytic cracking process.

21. The method of claim 20 wherein the step of supplying combustion gas to the expander includes passing the gas through a flow path that includes a vertically downward portion and a 90° bend with the bypass line initially extending tangentially from approximately the mid point of the 90° bend and the step of regulating the flow in the bypass line includes creating a pressure drop in the bypass line so that the particulates pass into the bypass line due to the pressure drop and centrifugal force.

* * * * *